(12) United States Patent
Shimizu (10) Patent No.: US 12,403,663 B2
(45) Date of Patent: Sep. 2, 2025

(54) SCULPTED OBJECT, MANUFACTURING METHOD FOR SCULPTED OBJECT, PHOTO-SCULPTING APPARATUS, GENERATION METHOD FOR PROCESSING PROGRAM, AND RECORDING MEDIUM

(71) Applicant: CANON KABUSHIKI KAISHA, Tokyo (JP)

(72) Inventor: Takuya Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 18/188,594

(22) Filed: Mar. 23, 2023

(65) Prior Publication Data
US 2023/0321920 A1    Oct. 12, 2023

(30) Foreign Application Priority Data
Apr. 7, 2022  (JP) .................... 2022-063703

(51) Int. Cl.
| | | |
|---|---|---|
| *B29C 64/40* | (2017.01) | |
| *B29C 64/124* | (2017.01) | |
| *B33Y 10/00* | (2015.01) | |
| *B33Y 30/00* | (2015.01) | |
| *B33Y 40/20* | (2020.01) | |

(52) U.S. Cl.
CPC ............ *B29C 64/40* (2017.08); *B29C 64/124* (2017.08); *B33Y 10/00* (2014.12); *B33Y 30/00* (2014.12); *B33Y 40/20* (2020.01); *Y10T 428/24628* (2015.01); *Y10T 428/24942* (2015.01)

(58) Field of Classification Search
CPC ..... B29C 64/40; B29C 64/124; B29C 64/282; B33Y 10/00; B33Y 30/00; B33Y 40/20; Y10T 428/24628; Y10T 428/24942
See application file for complete search history.

(56) References Cited

U.S. PATENT DOCUMENTS

2014/0316549 A1    10/2014  Zenere

FOREIGN PATENT DOCUMENTS

| EP | 681906 A2 | * 11/1995 | ........... B29C 64/135 |
|---|---|---|---|
| JP | 07100939 A | * 4/1995 | |
| JP | 9-85837 A | 3/1997 | |
| JP | 2017-077683 A | 4/2017 | |
| JP | 2018183968 A | * 11/2018 | |
| JP | 2021-115751 A | 8/2021 | |

OTHER PUBLICATIONS

[NPL-1] Naruo et al. (JP H07-100939 A); Apr. 18, 1995 (European Patent Office machine translation to English). (Year: 1995).*
[NPL-2] Hiraiwa et al. (JP 2018-183968 A); Nov. 22, 2018 (European Patent Office machine translation to English). (Year: 2018).*

* cited by examiner

*Primary Examiner* — Donald M Flores, Jr.
(74) *Attorney, Agent, or Firm* — Venable LLP (57) ABSTRACT

A sculpted object formed from a cured product of a photo-curable resin composition includes a sculpted surface, and a support removal trace recessed with respect to the sculpted surface. The support removal trace has a higher surface roughness than a surface roughness of the sculpted surface.

18 Claims, 8 Drawing Sheets

| No. | PRESENCE/ABSENCE OF SHARED LAYER | RADIATION ENERGY DENSITY E2 [mJ/cm²] | RADIATION ENERGY DENSITY E1 [mJ/cm²] | EVALUATION RESULT | DEPTH OF RECESS | CURING REACTION RATE |
|---|---|---|---|---|---|---|
| COMPARATIVE EXAMPLE | ABSENT | 80 | — | B | — | |
| EXAMPLE 1 | PRESENT | 80 | 30 | A | 80 μm–100 μm | 40%–50% |
| EXAMPLE 2 | | 80 | 50 | A | 150 μm–190 μm | 60%–80% |

SCULPTED OBJECT, MANUFACTURING METHOD FOR SCULPTED OBJECT, PHOTO-SCULPTING APPARATUS, GENERATION METHOD FOR PROCESSING PROGRAM, AND RECORDING MEDIUM

BACKGROUND OF THE INVENTION

Field of the Invention

The disclosure invention relates to a technique for a sculpted object formed from a cured product of a photocurable resin composition.

Description of the Related Art

As a method for manufacturing a sculpted object such as parts of a wide variety in small lots, photo-sculpting using a photocurable resin composition in a liquid form is known. While photo-sculpting is advantageous in that a sculpted object can be manufactured in a short time, a supporting structure called a support needs to be formed in addition to the sculpted object in photo-sculpting. The support has a role of supporting the sculpted object in photo-sculpting, but needs to be removed after the photo-sculpting because the support is not necessary for the sculpted object. Further, when removing the support from the sculpted object, it is necessary to make sure that a large defect is not generated in the sculpted object.

Japanese Patent Laid-Open No. H09-85837 discloses a configuration in which the strength of a bonding portion between the surface of a sculpted object and a support is set to be low such that the bonding portion is easy to break in order to make it less likely to cause a defect in the sculpted object when removing the support.

In addition, Japanese Patent Laid-Open No. 2018-183968 discloses a configuration in which a support trace is formed in a recess portion such that a protrusion serving as a support trace after support removal does not interfere with other members.

However, in Japanese Patent Laid-Open No. H09-85837, since a residue of the support remains as a protrusion on the sculpted object, a work such as a polishing work needs to be performed to remove the residue of the support, which is a pain for the worker. In addition, in Japanese Patent Laid-Open No. 2018-183968, the shape of the sculpted object needs to be designed such that a recess portion is provided on the sculpted object and the support residue remaining as a protrusion is within the recess portion such that the support residue does not interfere with other members. Therefore, the worker that designs the shape of the sculpted object has a lot of work to do.

SUMMARY OF THE INVENTION

According to a first aspect of the present invention, a sculpted object formed from a cured product of a photocurable resin composition includes a sculpted surface, and a support removal trace recessed with respect to the sculpted surface. The support removal trace has a higher surface roughness than a surface roughness of the sculpted surface.

According to a second aspect of the present invention, a manufacturing method for a sculpted object in which the sculpted object is formed by curing a photocurable resin composition includes radiating light onto the photocurable resin composition to form a first cured layer serving as part of a support, and radiating light onto the photocurable resin composition to form a second cured layer including a first portion and a second portion. The first portion overlaps the first cured layer as viewed in a thickness direction of the first cured layer. The second portion is positioned around the first portion and serves as part of the sculpted object. The forming the second cured layer includes forming the second cured layer such that a curing degree of the first portion is lower than a curing degree of the second portion.

According to a third aspect of the present invention, a photo-sculpting apparatus configured to form a sculpted object by curing a photocurable resin composition includes a container configured to reserve the photocurable resin composition, and a controller configured to control light to irradiate the photocurable resin composition in the container. The controller is configured to execute processing of radiating light onto the photocurable resin composition in the container to form a first cured layer serving as part of a support, and processing of radiating light onto the photocurable resin composition in the container to form a second cured layer including a first portion and a second portion. The first portion overlaps the first cured layer as viewed in a thickness direction of the first cured layer. The second portion is positioned around the first portion and serves as part of the sculpted object. In the processing of forming the second cured layer, the controller performs control such that a first radiation energy density of light irradiating the first portion is lower than a second radiation energy density of light irradiating the second portion.

According to a fourth aspect of the present invention, a generation method for a processing program used for photo-sculpting of a sculpted object includes obtaining first shape data indicating a sculpted object shape, obtaining second shape data indicating a support shape, defining a relationship between the first shape data and the second shape data such that part of the support shape overlaps a first portion of the sculpted object shape, and defining a first radiation energy density of light used for sculpting the first portion and a second radiation energy density of light used for sculpting a second portion of the sculpted object shape other than the first portion such that the first radiation energy density is lower than the second radiation energy density.

According to a fifth aspect of the present invention, a non-transitory computer-readable recording medium stores a processing program to be executed by a computer of a photo-sculpting apparatus configured to form a sculpted object by curing a photocurable resin composition. The processing program includes causing the computer to control light irradiating the photocurable resin composition to form a first cured layer serving as part of a support, and causing the computer to control the light irradiating the photocurable resin composition to form a second cured layer including a first portion and a second portion. The first portion overlaps the first cured layer as viewed in a thickness direction of the first cured layer. The second portion is positioned around the first portion and serves as part of the sculpted object. The forming the second cured layer includes forming the second cured layer such that a curing degree of the first portion is lower than a curing degree of the second portion.

Further features of the present invention will become apparent from the following description of exemplary embodiments with reference to the attached drawings.

DESCRIPTION OF THE EMBODIMENTS

Figure 1:
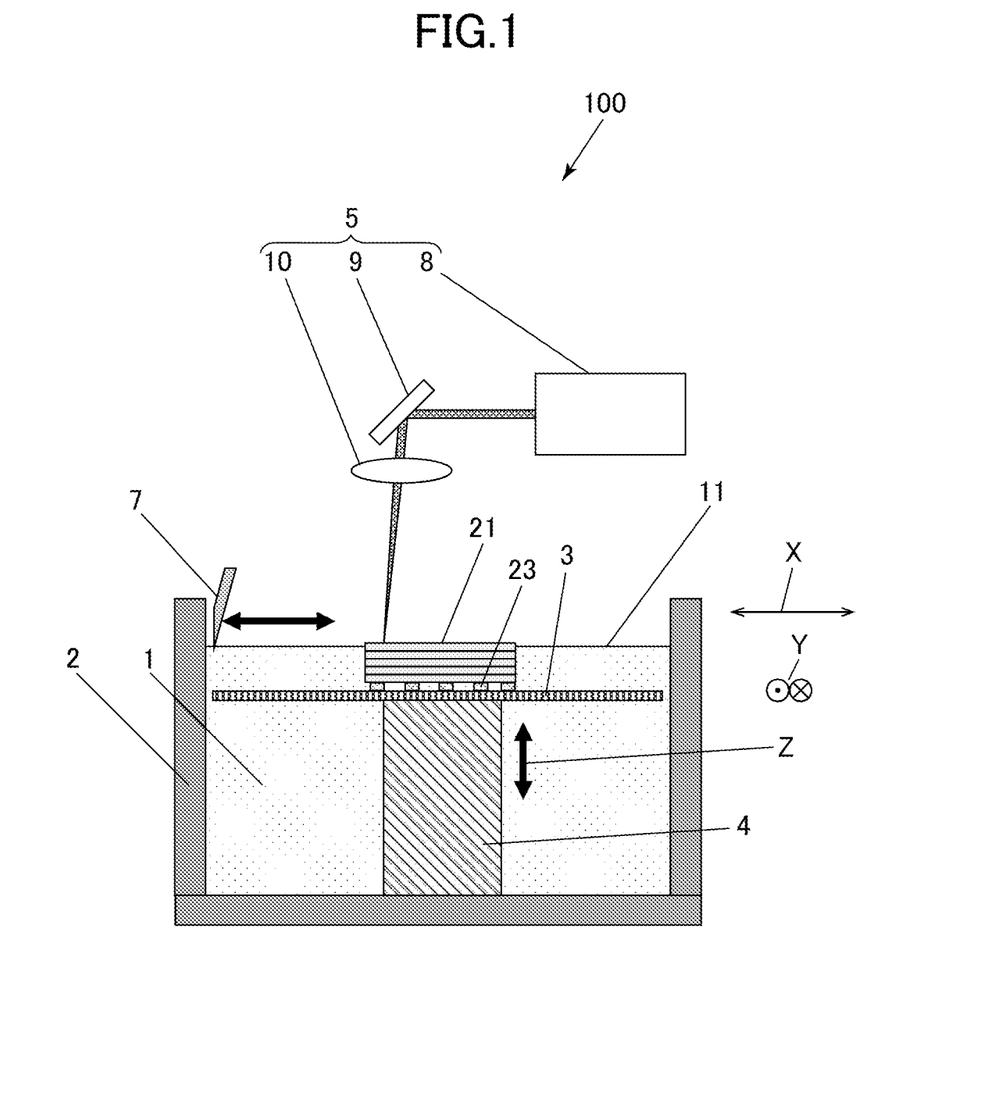
FIG. 1 is a schematic section view of a photo-sculpting apparatus according to an embodiment.

An exemplary embodiment of the present disclosure will be described in detail below with reference to drawings. FIG. 1 is a schematic section view of a photo-sculpting apparatus 100 according to the embodiment. The photo-sculpting apparatus 100 is an apparatus that forms a sculpted object 21 by a photo-sculpting method, that is, an apparatus that forms the sculpted object 21 by laminating a plurality of cured layers obtained by curing a photocurable resin composition 1. The sculpted object 21 is a cured product of the photocurable resin composition 1. The photo-sculpting apparatus 100 includes a container 2, a sculpting stage 3, a lifting apparatus 4, a light radiating portion (exposing portion) 5, and a supply apparatus 7.

The photocurable resin composition 1 is reserved in the container 2. The photocurable resin composition 1 reserved in the container 2 is an uncured photocurable resin composition, and is in a liquid form. The photocurable resin composition 1 is, for example, a UV-curable resin composition. The photocurable resin composition 1 is, for example, radically polymerizable. As the radically polymerizable photocurable resin composition, for example, acrylate-based resin compositions can be selected. Particularly, as the acrylate-based resin compositions, urethane acrylate-based, epoxy acrylate-based, polyester acrylate-based, and acrylic acrylate-based oligomers can be selected. The photocurable resin composition 1 may contain a reinforcing agent for improving mechanical strength, such as inorganic filler.

The light radiating portion 5 is configured to radiate light for curing the photocurable resin composition 1 toward the sculpting stage 3 from above the container 2, that is, configured to expose the photocurable resin composition 1 to light.

The sculpting stage 3 functions as a base supporting a cured product of the photocurable resin composition 1 cured by the light radiation by the light radiating portion 5, and is disposed in the container 2 to be movable in the up-down direction serving as a Z direction. The sculpting stage 3 is driven in the Z direction by the lifting apparatus 4. The lifting apparatus 4 lifts and lowers the sculpting stage 3 in the Z direction in accordance with an input command.

The supply apparatus 7 is an apparatus that supplies the photocurable resin composition 1 reserved in the container 2 onto the cured product on the sculpting stage 3. The supply apparatus 7 includes a recoater or a squeegee used for flattening a liquid surface 11.

The light radiating portion 5 includes a light source 8, a mirror unit 9, and a lens unit 10. The light source 8 is, for example, a laser light source that emits laser light. The wavelength of the light emitted from the light source 8 may be a wavelength suitable for the polymerization reaction of the photocurable resin composition 1. For example, if the photocurable resin composition 1 is UV-curable, the light emitted from the light source 8 is ultraviolet light, for example, light of a wavelength selected from a range of about 200 nm to 400 nm. The wavelength of the light emitted from the light source 8 is typically 405 nm or 365 nm.

The mirror unit 9 includes a galvano mirror and the like. The light emitted from the light source 8 passes the mirror unit 9 and the lens unit 10, and forms a light spot on the liquid surface 11 of the photocurable resin composition 1 in the container 2. As a result of the mirror unit 9 being driven, the light spot on the liquid surface 11 is moved in a scanning manner in X and Y directions that are horizontal directions. By such planar scanning of the light spot, part of the photocurable resin composition 1 in the container 2 corresponding to a shape of one layer of the sculpted object 21 can be cured. Then, by lowering the sculpting stage 3 by an amount corresponding to one layer each time, a plurality of cured layers can be formed.

To be noted, although a configuration in which the light radiating portion 5 moves the light spot in a scanning manner in the plane is employed in the embodiment, the configuration is not limited to this. The light radiating portion 5 may be constituted by a projector that planarly radiates image light onto the liquid surface 11.

Figure 2:
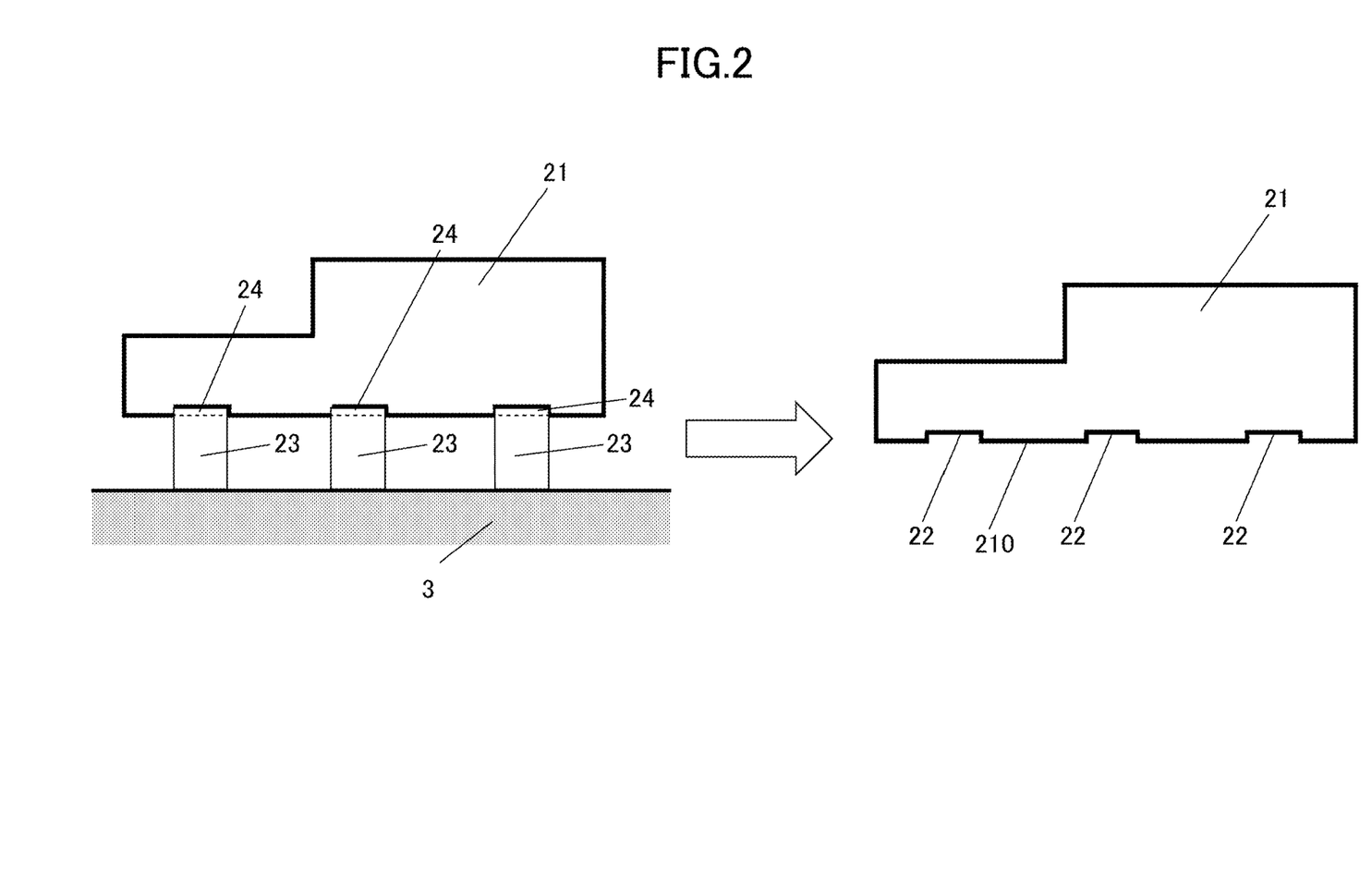
FIG. 2 is a simplified section view of a sculpted object according to the embodiment.

FIG. 2 is a simplified section view of the sculpted object 21 according to the embodiment. FIG. 2 illustrates a state before supports 23 are removed from the sculpted object 21 and a state after the supports 23 are removed from the sculpted object 21. The sculpted object 21 includes support removal traces 22 formed by removing the supports 23. According to the present embodiment, the support removal traces 22 are formed to be recessed with respect to a sculpted surface 210 around the support removal traces 22, and thus interference with other members can be suppressed. Although the sculpted surface 210 is preferably a flat surface, the configuration is not limited to this. A shared layer 24 where the sculpted object 21 and the supports 23 are both present before the supports 23 are removed from the sculpted object 21 includes a portion serving as part of the sculpted object 21 and a portion serving as part of the supports 23 when the supports 23 are removed from the sculpted object 21. The shared layer 24 is designed such that residual protrusions do not remain on the sculpted object 21 when the supports 23 are removed from the sculpted object 21. Therefore, the surface state of the support removal traces 22 of the present embodiment is not a defected state. The state of the support removal traces 22 of the present embodiment will be described in detail later.

Figure 3A:
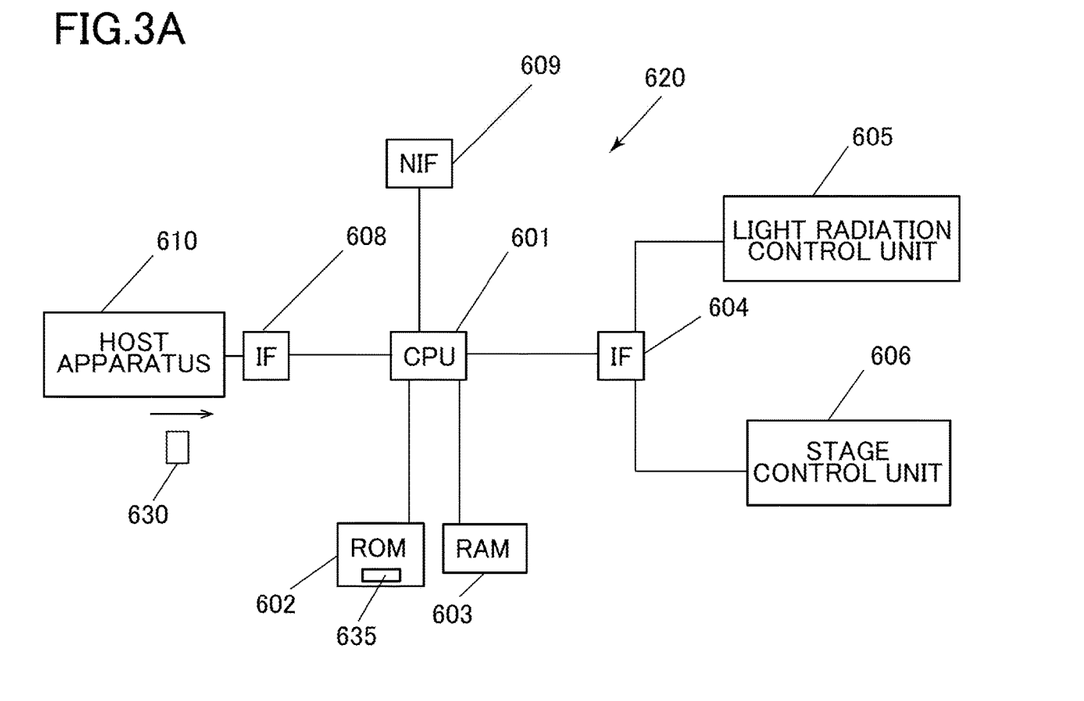
FIG. 3A is a block diagram of a control system of the photo-sculpting apparatus according to the embodiment.

FIG. 3A is a block diagram illustrating a configuration of the control system of the photo-sculpting apparatus 100 according to the embodiment. The photo-sculpting apparatus 100 includes a host apparatus 610, a control apparatus 620, a light radiation control unit 605, and a stage control unit 606. The host apparatus 610 and the control apparatus 620 are each constituted by a computer.

The host apparatus 610 generates a processing program 630. The control apparatus 620 obtains the processing program 630 from the host apparatus 610, and transmits a control command to each of the light radiation control unit 605 and the stage control unit 606 at a predetermined control cycle in accordance with the processing program 630.

The light radiation control unit 605 controls the light source 8 and the mirror unit 9 of the light radiating portion 5 in accordance with the control command obtained from the control apparatus 620. The stage control unit 606 controls, in accordance with the control command obtained from the control apparatus 620, the lifting apparatus 4 that drives the sculpting stage 3. In addition, the stage control unit 606 controls the supply apparatus 7 in accordance with the control command obtained from the control apparatus 620. As a result of this, the control apparatus 620 controls the behavior of each of the light radiating portion 5, the sculpting stage 3, and the supply apparatus 7 in accordance with the processing program 630, and is thus able to photo-sculpt the sculpted object 21 on the sculpting stage 3. The processing program 630 and the generation method for the processing program 630 will be described.

The control apparatus 620 includes a central processing unit: CPU 601 that is an example of a processor, a read-only memory: ROM 602 and a random access memory: RAM 603 that are examples of a storage device, and interfaces: IFs 604 and 608 that are each an input/output interface, and a network interface: NIF 609. The CPU 601, the ROM 602, the RAM 603, the IFs 604 and 608, and the NIF 609 are mutually communicably connected to each other.

The CPU 601 obtains the processing program 630 from the host apparatus 610 via the IF 608. The CPU 601 executes application software 635 serving as a control program, and thus functions as a controller that executes a sculpting control procedure following the processing program 630. That is, the CPU 601 controls the light source 8 and the mirror unit 9 via the IF 604 and the light radiation control unit 605 in accordance with the processing program 630. In addition, the CPU 601 controls the lifting apparatus 4 and the supply apparatus 7 via the IF 604 and the stage control unit 606 in accordance with the processing program 630.

The ROM 602 stores the control program 635 that can be executed by the CPU 601. That is, the ROM 602 constitutes a non-transitory computer-readable recording medium storing the control program 635. The ROM 602 may be a rewritable storage device such as an erasable programmable read-only memory: EPROM or an electrically erasable programmable read-only memory: EEPROM. In addition, the control apparatus 620 may include a storage capable of storing the control program 635, such as a hard disk drive: HDD or a solid state device: SSD.

To be noted, the control program 635 to be executed by the CPU 601 is not limited to a case where the control program 635 is stored in a recording medium included in a computer such as the ROM 602. The control program 635 may be stored in a storage device or a recording disk that can be supplied to a computer as long as the control program 635 is stored in a non-transitory computer-readable recording medium. In addition, the control program 635 may be downloaded to a computer from a network via the NIF 609.

The IFs 604 and 608 and the NIF 609 can be configured on the basis of, for example, serial interface standards or parallel interface standards.

Figure 3B:
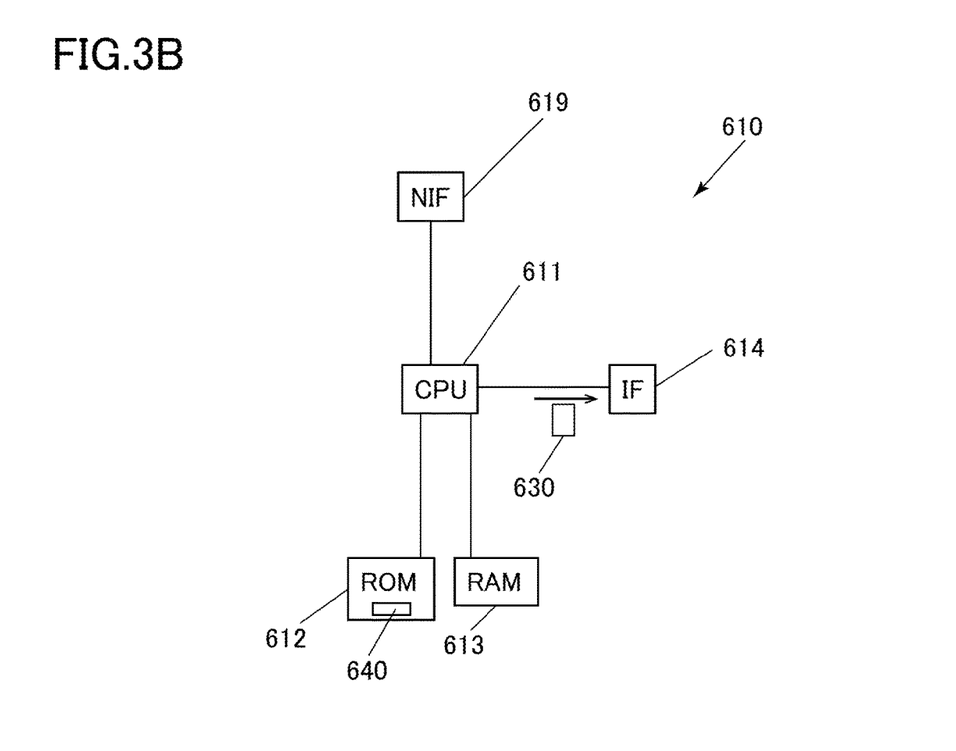
FIG. 3B is a block diagram illustrating a configuration of a host apparatus according to the embodiment.

FIG. 3B is a block diagram illustrating a configuration of the host apparatus 610 according to the embodiment. The host apparatus 610 includes a CPU 611 that is an example of a processor, a ROM 612 and a RAM 613 that are examples of a storage device, an IF 614 that is an input/output interface, and an NIF 619 that is a network interface. The CPU 611, the ROM 612, the RAM 613, the IF 614, and the NIF 619 are mutually communicably connected to each other.

The CPU 611 executes application software (generation program) 640 recorded (stored) in the ROM 612, and thus functions as a processor that generates the processing program 630. The CPU 611 generates the processing program 630, and transmits the generated processing program 630 to the control apparatus 620 via the IF 614.

The ROM 612 stores the generation program 640 that can be executed by the CPU 611. That is, the ROM 612 constitutes a non-transitory computer-readable recording medium storing the generation program 640. The ROM 612 may be a rewritable storage device such as an EPROM or an EEPROM. In addition, the host apparatus 610 may include a storage capable of storing the generation program 640, such as an HDD or an SSD.

To be noted, the generation program 640 to be executed by the CPU 611 is not limited to a case where the generation program 640 is stored in a recording medium included in a computer such as the ROM 612. The generation program 640 may be stored in a storage device or a recording disk that can be supplied to a computer as long as the generation program 640 is stored in a non-transitory computer-readable recording medium. In addition, the generation program 640 may be downloaded to a computer from a network via the NIF 619.

The IF 614 and the NIF 619 can be configured on the basis of, for example, serial interface standards or parallel interface standards.

The processing program 630 may be stored in a non-transitory computer-readable recording medium such as a storage device or a recording disk that can be supplied to the computer.

Figure 4:
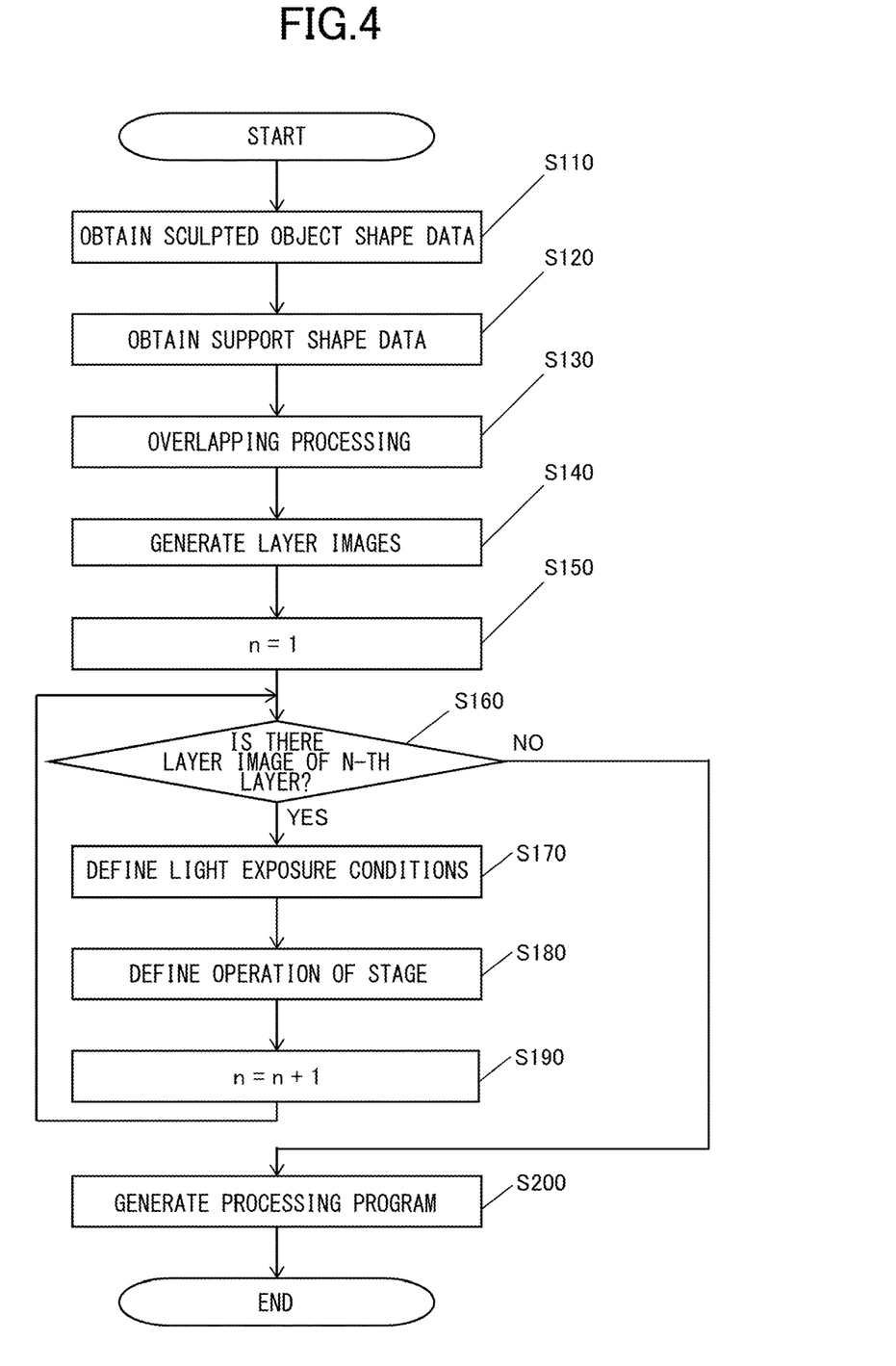
FIG. 4 is a flowchart illustrating a generation method for a processing program according to the embodiment.

Next, a generation method for the processing program 630 by the host apparatus 610 will be described. FIG. 4 is a flowchart illustrating a generation method for the processing program 630 according to the embodiment. FIGS. 5A to 5D are each an explanatory diagram of the generation method for the processing program 630.

Figure 5A:
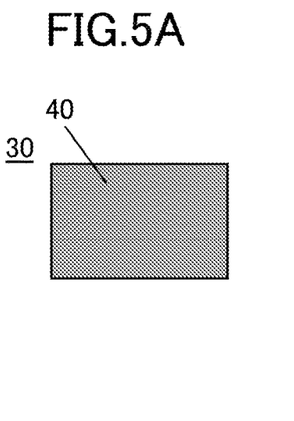
FIG. 5A is an explanatory diagram of the generation method for the processing program according to the embodiment.

In step S110, the CPU 611 of the host apparatus 610 obtains sculpted object shape data 30 indicating a sculpted object shape 40 as illustrated in FIG. 5A. The sculpted object shape data 30 is an example of first shape data. The sculpted object shape data 30 is, for example, shape data generated by three-dimensional computer-aided design: 3D-CAD. The sculpted object shape data 30 is shape data corresponding to a sculpted object (sculpting model) desired by the user, but is slightly different from the shape of the sculpted object 21 that is actually obtained, because the support removal traces 22 are formed on the actual sculpted object 21. That is, the sculpted object shape data 30 is shape data of a sculpted object not including the support removal traces. The sculpted object shape data 30 may be generated in the host apparatus 610, or may be read from the outside in the host apparatus 610.

Figure 5B:
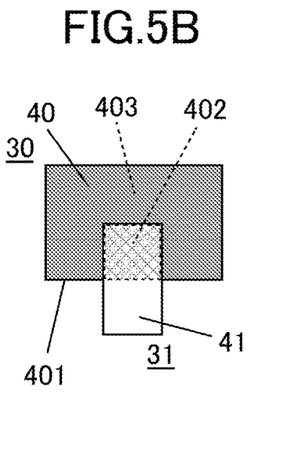
FIG. 5B is an explanatory diagram of the generation method for the processing program according to the embodiment.

In addition, in step S120, the CPU 611 obtains a plurality of pieces of support shape data 31 each indicating a support shape 41 as illustrated in FIG. 5B. The support shape data 31 is an example of second shape data. To be noted, FIG. 4B illustrates one piece of the support shape data 31. The support shape data 31 is shape data corresponding to the supports, but is slightly different from the shape of the supports 23 that are actually obtained, because part of the support shape data 31 is caused to enter, that is, bite into the sculpted object shape data 30 as will be described later. The support shape data 31 may be generated in the host apparatus 610, or may be read from the outside in the host apparatus 610.

A case where the support shape data 31 is generated in the host apparatus 610 will be described as an example. The CPU 611 determines, for the sculpted object shape 40 defined by the sculpted object shape data 30 obtained in step S110 and on the basis of a sculpting height and the like, a support placement surface 401 on which supports are disposed. Further, the CPU 611 determines the pitch of the supports on the basis of the maximum area where the sculpted object can be supported by the supports, and generates the plurality of pieces of the support shape data 31 illustrated in FIG. 4B.

In step S130, the CPU 611 defines the relationship, for example, the coordinate relationship between the sculpted object shape data 30 and the support shape data 31 such that part of the support shape 41 defined by the support shape data 31 overlaps a portion 402 among part inside the sculpted object shape 40 defined by the sculpted object shape data 30. As a result of this, the part inside the sculpted object shape 40 is defined by the portion 402 overlapping part of the support shape 41, and a portion 403 that is different from the portion 402 and that does not overlap the support shape 41. The portion 402 is an example of a first portion. The portion 403 is an example of a second portion. For example, the CPU 611 defines the coordinate relationship between the sculpted object shape data 30 and the support shape data 31 such that the support shape 41 defined by the support shape data 31 enters the support placement surface 401 of the sculpted object shape 40 defined by the sculpted object shape data 30 by a predetermined amount, for example, an entrance amount of 0.2 mm or less.

Figure 5C:
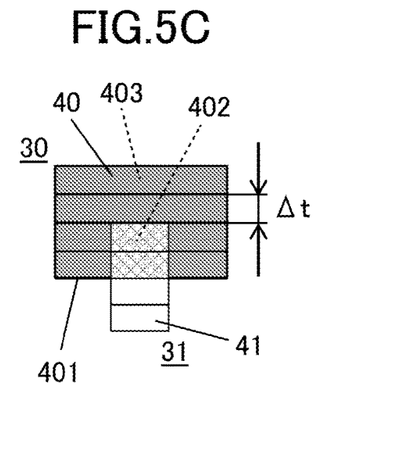
FIG. 5C is an explanatory diagram of the generation method for the processing program according to the embodiment.
Figure 5D:
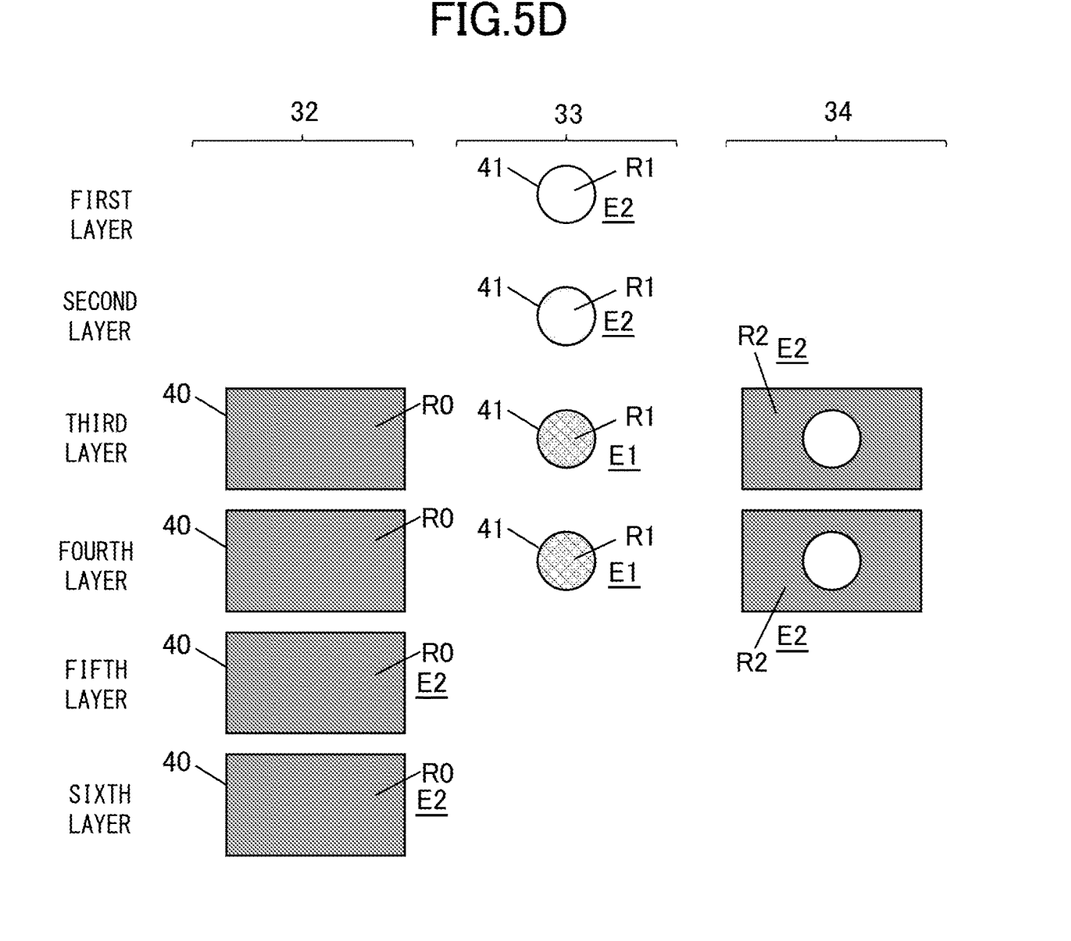
FIG. 5D is an explanatory diagram of the generation method for the processing program according to the embodiment.

Next, in step S140, the CPU 611 slices the sculpted object shape data 30 (sculpted object shape 40) obtained in step S110 at a pitch of a predetermined thickness Δt as illustrated in FIG. 5C. As a result of this, the CPU 611 generates layer images 32 of a plurality of layers indicating layer data as illustrated in FIG. 5D. To be noted, in the example of FIG. 5D, the layer images 32 of six layers are obtained. The layer images 32 of six layers are sequentially used for the sculpting in the order from the first layer to the sixth layer. To be noted, the layer images 32 of the first layer and the second layer are layer images not including the outline of the sculpted object shape 40. The layer images 32 from the third layer to the sixth layer are layer images including the outline of the sculpted object shape 40. The inside of the outline of the sculpted object shape 40 is part corresponding to resin.

In the same coordinate system as the sculpted object shape data 30, in step S140, the CPU 611 slices the support shape data 31 (support shape 41) obtained in step S120 at the pitch of the predetermined thickness Δt as illustrated in FIG. 5C. As a result of this, the CPU 611 generates layer images 33 of a plurality of layers indicating layer data as illustrated in FIG. 5D. In the example of FIG. 5D, the layer images 33 of six layers are obtained. The layer images 33 of six layers are sequentially used for the sculpting in the order from the first layer to the sixth layer. To be noted, the layer images 33 of the fifth layer and the sixth layer are layer images not including the outline of the support shape 41. The layer images 33 from the first layer to the fourth layer are layer images including the outline of the support shape 41. The inside of the outline of the support shape 41 is part corresponding to resin. To be noted, Δt corresponds to the thickness of one layer of the cured layer of the photocurable resin composition 1 to be formed in the sculpting step.

Steps S150 to S190 are steps for processing, layer by layer, the layers images 32 and 33 of the plurality of layers generated in step S140. First, in step S150, the CPU 611 sets n to 1.

Next, in step S160, the CPU 611 determines whether or not there are a layer image 32 and a layer image 33 of the n-th layer. In this case, since n is 1, the CPU 611 determines whether or not there are a layer image 32 and a layer image 33 of the first layer. In the case where the result of step S160 is YES, that is, in the case where there are the layer image 32 and the layer image 33 of the first layer, the CPU 611 obtains the layer images of the first layer from the layer images 32 and 33 of the plurality of layers generated in step S140.

To be noted, in the case where the result of step S160 is NO, that is, in the case where there is no layer image 32 or layer image 33 of the n-th layer, the CPU 611 proceeds to the generation processing of the processing program 630 of step S200. The processing program 630 is, for example, generated in a file format.

In the case where the result of step S160 is YES, in step S170, the CPU 611 determines whether or not there is a region where a region R0 inside the outline of the sculpted object shape 40 and a region R1 inside the outline of the support shape 41 overlap in the layer images 32 and 33 of the first layer.

In the example of FIG. 5D, in the first layer, since there is no outline of the sculpted object shape 40, there is no region where the sculpted object shape 40 and the support shape 41 overlap, and there is only the region R1 inside the outline of the support shape 41. Therefore, the CPU 611 defines the light exposure conditions, that is, a radiation energy density E2 of the light for the region R1 of the first layer. That is, the CPU 611 defines the radiation energy density E2 of the light for forming the supports 23 in the first layer. As the radiation energy density E2 of the light, for example, the power of the light source 8 and the scanning speed of the light are defined. The radiation energy density E2 of the light is defined such that the curing degree (curing reaction rate) of the photocurable resin composition 1 is 100%, that is, such that the photocurable resin composition 1 is sufficiently cured.

Next, in step S180, the CPU 611 defines the movement amount and movement speed of the sculpting stage 3. Then, in step S190, the CPU 611 increments n by 1, that is, performs n=n+1, and returns to the processing of step S160.

Since there is no outline of the sculpted object shape 40 in the second layer either, there is no region where the sculpted object shape 40 and the support shape 41 overlap, and there is only the outline of the support shape 41. Therefore, the CPU 611 defines the light exposure conditions, that is, the radiation energy density E2 of the light for the region R1 of the second layer.

In the third layer, there is a region where the region R0 inside the outline of the sculpted object shape 40 and the region R1 inside the outline of the support shape 41 overlap. The overlapping region is the region R1. In step S170, the CPU 611 generates a difference image 34. The difference image 34 corresponds to a region R2 obtained by deleting the region R1 inside the outline of the support shape 41 from the region R0 inside the outline of the sculpted object shape 40.

The CPU 611 defines the light exposure conditions, that is, the radiation energy density E2 of the light for the region R2 of the third layer, and defines lower light exposure conditions, that is, a radiation energy density E1 lower than the radiation energy density E2 for the region R1 of the third layer. The ratio of the radiation energy density E1 to the radiation energy density E2, that is, E1/E2 is preferably set to 0.3 or more and 0.7 or less, and is more preferably set to 0.4 or more and 0.6 or less. The radiation energy density E1 is an example of a first radiation energy density, and the radiation energy density E2 is an example of a second radiation energy density.

Also in the fourth layer, there is a region where the region R0 inside the outline of the sculpted object shape 40 and the region R1 inside the outline of the support shape 41 overlap. The overlapping region is the region R1. Therefore, in step S170, the CPU 611 defines the light exposure conditions, that is, the radiation energy density E2 of the light for the region R2 of the fourth layer, and defines lower light exposure conditions, that is, the radiation energy density E1 lower than the radiation energy density E2 for the region R1 of the fourth layer.

As described above, in step S170, the CPU 611 defines the radiation energy densities E1 and E2 such that the radiation energy density E1 of the light used for sculpting the portion 402 is lower than the radiation energy density E2 of the light used for sculpting the portion 403.

In the fifth layer, since there is no outline of the support shape 41, there is no region where the sculpted object shape 40 and the support shape 41 overlap, and there is only the outline of the sculpted object shape 40. Therefore, the CPU 611 defines the light exposure conditions, that is, the radiation energy density E2 of the light for the region R0 of the fifth layer.

In the sixth layer, since there is no outline of the support shape 41, there is no region where the sculpted object shape 40 and the support shape 41 overlap, and there is only the outline of the sculpted object shape 40. Therefore, the CPU 611 defines the light exposure conditions, that is, the radiation energy density E2 of the light for the region R0 of the sixth layer.

In the case where the result of step S160 is NO, that is, in the case where the definition has been completed for all the layers, the CPU 611 generates, as the processing program 630, a file including the layer images 32 excluding the third and fourth layers, the layer images 33, the difference images 34, and definition of the light exposure conditions and the operation of the sculpting stage 3. The processing program 630 is transmitted to the control apparatus 620, and is used for sculpting the sculpted object 21.

A manufacturing method for manufacturing the sculpted object 21 by curing the photocurable resin composition 1 by using the photo-sculpting apparatus 100 will be described below. The CPU 601 of the control apparatus 620 executes a sculpting control procedure according to the processing program 630. A case where the first to sixth cured layers are formed in accordance with the processing program 630 will be described as an example.

FIGS. 6A to 6I are explanatory diagrams of respective steps of the manufacturing method for the sculpted object 21 according to the embodiment. The sculpted object 21 is formed by curing the photocurable resin composition 1 through the following steps.

First, the photocurable resin composition 1 in an uncured state is charged into the container 2 illustrated in FIG. 1, and the position of the sculpting stage 3 in the Z direction is adjusted such that the distance between the sculpting stage 3 and the liquid surface 11 is the thickness Δt. To be noted, each time the sculpting stage 3 is lowered, the liquid surface 11 is flattened by the supply apparatus 7 such that the liquid surface 11 is stable. In the case of using the photocurable resin composition 1 that shrinks when cured, the distance between the sculpting stage 3 and the liquid surface 11 may be set to a value that is a sum of Δt of the slice data and the amount of shrinkage.

Figure 6A:
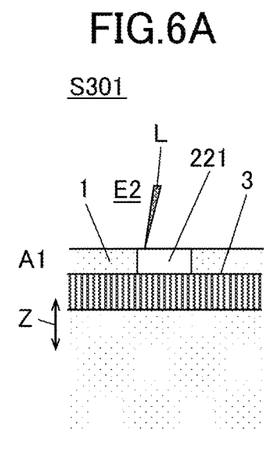
FIG. 6A is an explanatory diagram of a manufacturing method for the sculpted object according to the embodiment.

In step S301 illustrated in FIG. 6A, the CPU 601 controls the light radiating portion 5 to radiate light L of the radiation energy density E2 onto the photocurable resin composition 1, and thus forms a cured layer A1 that is the first layer serving as a portion 221 of the support 23.

Figure 6B:
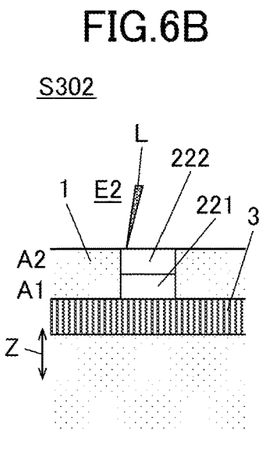
FIG. 6B is an explanatory diagram of the manufacturing method for the sculpted object according to the embodiment.

Next, in step S302 illustrated in FIG. 6B, the CPU 601 controls the sculpting stage 3 to lower the sculpting stage 3 by the thickness Δt. Then, the CPU 601 controls the light radiating portion 5 to radiate the light L of the radiation energy density E2 onto the photocurable resin composition 1, and thus forms a cured layer A2 that is the second layer serving as a portion 222 of the support 23 on the cured layer A1. The cured layer A2 is an example of a first cured layer.

Figure 6C:
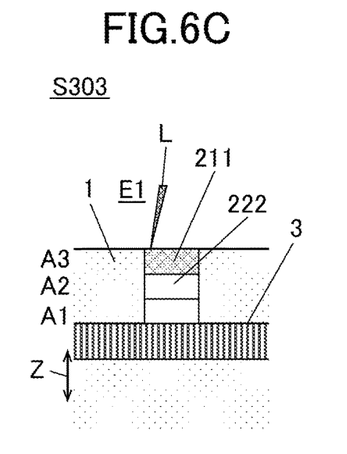
FIG. 6C is an explanatory diagram of the manufacturing method for the sculpted object according to the embodiment.

Next, in step S303 illustrated in FIG. 6C, the CPU 601 controls the sculpting stage 3 to lower the sculpting stage 3 by the thickness Δt. Then, the CPU 601 controls the light radiating portion 5 to radiate the light L of the radiation energy density E1 onto the photocurable resin composition 1, and thus forms, on the cured layer A2, a portion 211 that overlaps the cured layer A2 (portion 222) as viewed in the Z direction serving as the thickness direction of the cured layer A2.

Figure 6D:
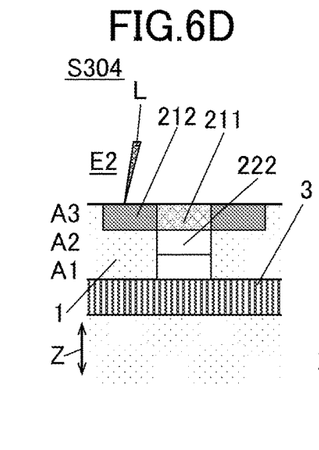
FIG. 6D is an explanatory diagram of the manufacturing method for the sculpted object according to the embodiment.

Next, in step S304 illustrated in FIG. 6D, the CPU 601 controls the light radiating portion 5 to radiate the light L of the radiation energy density E2 onto a part of the photocurable resin composition 1 around the portion 211, and thus a portion 212 not overlapping the cured layer A2 (portion 222) as viewed in the Z direction. That is, the portion 212 is formed after the portion 211 is formed.

In steps S303 and S304 illustrated in FIGS. 6C and 6D, a cured layer A3 that is the third layer including the portion 211 and the portion 212 is formed. The cured layer A3 is an example of a second cured layer. The portion 212 serves as part of the sculpted object 21. The portion 212 is positioned around the portion 211.

In steps S303 and S304, the radiation energy density E1 of the light radiated for forming the portion 211 is set to be lower than the radiation energy density E2 of the light radiated for forming the portion 212, and thus the curing degree of the portion 211 is lower than the curing degree of the portion 212. To be noted, the layer where the curing degree is lowered is not limited to one layer, and the curing degree may be lowered in a plurality of consecutive layers.

Figure 6E:
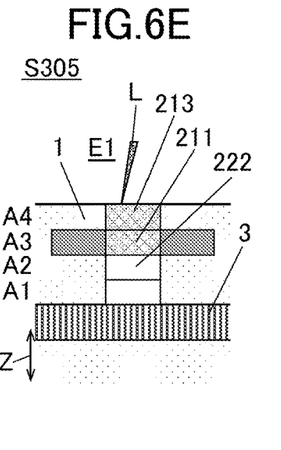
FIG. 6E is an explanatory diagram of the manufacturing method for the sculpted object according to the embodiment.

In step S305 illustrated in FIG. 6E, the CPU 601 controls the sculpting stage 3 to lower the sculpting stage 3 by the thickness Δt. Then, the CPU 601 controls the light radiating portion 5 to radiate the light L of the radiation energy density E1 to the photocurable resin composition 1, and thus forms, on the portion 211, a portion 213 overlapping the portions 211 and 222 as viewed in the Z direction.

Figure 6F:
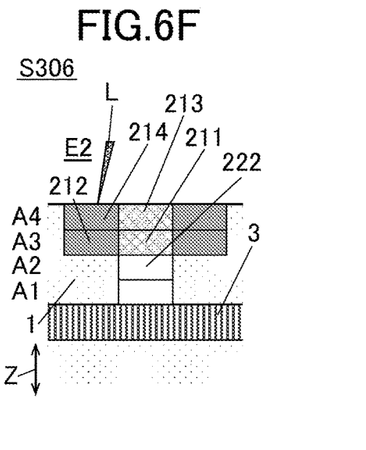
FIG. 6F is an explanatory diagram of the manufacturing method for the sculpted object according to the embodiment.

Next, in step S306 illustrated in FIG. 6F, the CPU 601 controls the light radiating portion 5 to radiate the light L of the radiation energy density E2 onto the photocurable resin composition 1 in a portion around the portion 213, and thus forms a portion 214 not overlapping the portions 211 and 222 as viewed in the Z direction. That is, the portion 214 is formed after the portion 213 is formed.

In steps S305 and S306 illustrated in FIGS. 6E and 6F, a cured layer A4 that is the fourth layer including the portions 213 and 214 is formed. The portion 214 serves as part of the sculpted object 21. The portion 214 is positioned around the portion 213.

In steps S305 and S306, the radiation energy density E1 of the light radiated for forming the portion 213 is set to be lower than the radiation energy density E2 of the light radiated for forming the portion 214, and thus the curing degree of the portion 213 is lower than the curing degree of the portion 214.

Figure 6G:
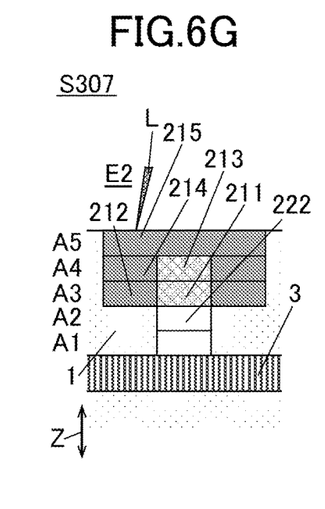
FIG. 6G is an explanatory diagram of the manufacturing method for the sculpted object according to the embodiment.

Next, in step S307 illustrated in FIG. 6G, the CPU 601 controls the sculpting stage 3 to lower the sculpting stage 3 by the thickness Δt. Then, the CPU 601 controls the light radiating portion 5 to radiate the light L of the radiation energy density E2 onto the photocurable resin composition 1, and thus forms, on the cured layer A4, a cured layer A5 that is the fifth layer serving as a portion 215 of the sculpted object 21.

Figure 6H:
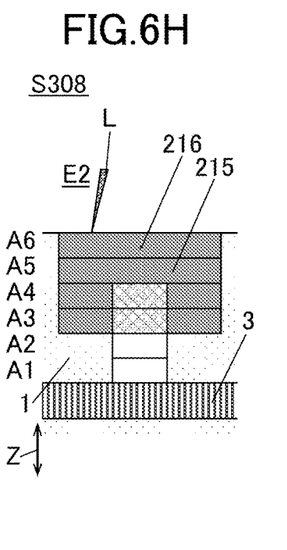
FIG. 6H is an explanatory diagram of the manufacturing method for the sculpted object according to the embodiment.

Next, in step S308 illustrated in FIG. 6H, the CPU 601 controls the sculpting stage 3 to lower the sculpting stage 3 by the thickness Δt. Then, the CPU 601 controls the light radiating portion 5 to radiate the light L of the radiation energy density E2 onto the photocurable resin composition 1, and thus forms, on the cured layer A5, a cured layer A6 that is the sixth layer serving as a portion 216 of the sculpted object 21.

As described above, by radiating the light L emitted from the light source 8 onto only a required portion, the photocurable resin composition 1 on the sculpting stage 3 can be selectively cured. As described above, by repeating the lowering operation of the sculpting stage 3 and the light radiation onto the sculpting stage 3 or the cured product on the sculpting stage 3, the sculpted object 21 can be formed on the sculpting stage 3. To be noted, although a case where the six cured layers A1 to A6 are formed has been described as an example, the number of layers for the sculpting of the sculpted object and the supports is not limited to the example described above.

Figure 6I:
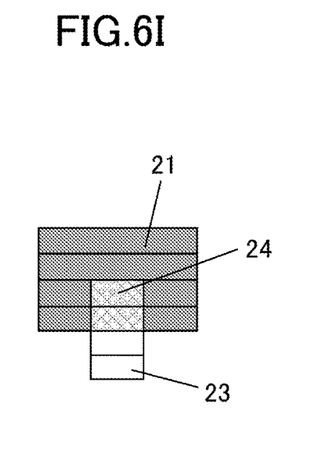
FIG. 6I is an explanatory diagram of the manufacturing method for the sculpted object according to the embodiment.

Next, as illustrated in FIG. 6I, the sculpted object 21 is taken out of the photo-sculpting apparatus 100, and postprocessing is performed. Specifically, the sculpting stage 3 to which the sculpted object 21 is fixed via the supports 23 is detached from the container 2, and the sculpted body including the sculpted object 21 and the support 23 is separated from the sculpting stage 3 by using a tool such as a scraper or a spatula. Then, the photocurable resin composition 1 attaching to the sculpted object 21 and the supports 23 in an uncured state is removed by using a solvent such as ethanol or isopropyl alcohol: IPA. At this time, the photocurable resin composition 1 can be easily removed in a short time by using an ultrasonic cleaner.

Next, a load is applied to the supports 23 connected to the sculpted surface 210 of the sculpted object 21, and thus the supports 23 are removed from the sculpted object 21. The removal operation may be directly performed by the hand of a worker, or may be performed by the worker using a tool such as a scraper.

Figure 7:
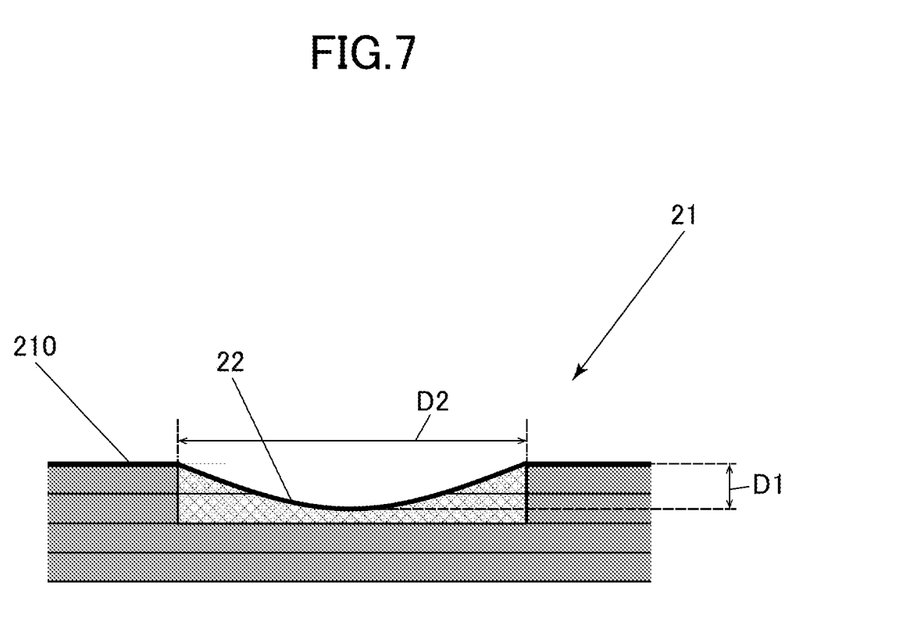
FIG. 7 is a simplified enlarged section view of a support removal trace of the sculpted object and the vicinity thereof according to the embodiment.

In FIG. 6I, the shared layer 24 between the sculpted object 21 and the supports 23 has a curing degree lower than that of the other portions, and can be more easily broken in the removal operation of removing the supports 23 from the sculpted object 21. By this removal operation, the support removal traces 22 illustrated in FIG. 7 are formed on the sculpted object 21. To be noted, the shared layer 24 is in the sculpted object 21 before the supports 23 are removed from the sculpted object 21. Therefore, the shared layer 24 before the supports 23 are removed from the sculpted object 21 is not exposed to the outside, or only slightly exposed to the outside. Then, the shared layer 24 breaks when removing the supports 23 from the sculpted object 21, and becomes part of the sculpted object 21 and part of the supports 23. FIG. 7 is a simplified enlarged section view of a support removal trace 22 of the sculpted object 21 and the vicinity thereof. The support removal trace 22 has a recessed shape lower than the sculpted surface 210 of the sculpted object 21.

The support removal trace 22 is formed in a recessed shape whose average line of a roughness curve in the cross-section is smooth, that is, in a bowl shape. The depth D1 of the support removal trace 22 with respect to the sculpted surface 210 is preferably 0.5 mm or less, and is more preferably 0.2 mm or less. That is, the thickness of the shared layer 24 to be irradiated with the light of the radiation energy density E1 described above is preferably set to 0.5 mm or less, and is more preferably set to 0.2 mm or less. As a result of this, breakage of the sculpted object 21 at the time of removing the supports 23 from the sculpted object 21 can be effectively reduced.

The surface roughness of the support removal traces 22 is higher than the surface roughness of the sculpted surface 210. This is because the curing degree of the shared layer 24 is lower than the curing degree of the other portions, therefore ductile fracture occurs in the interface between the sculpted object 21 and the supports 23, and the broken surface is rougher than the sculpted surface 210 of the sculpted object 21.

When measured by a laser microscope having a resolution of 0.005 μm and including a lens having a magnification of 20×, the arithmetic mean roughness Ra of the sculpted surface 210 of the sculpted object 21 is 5 μm. In contrast, the arithmetic mean roughness Ra of the support removal traces 22 is 10 μm or more and 15 μm or less.

The shape of the support removal trace 22 is determined by the sectional shape of the support 23, and is preferably set to a circular shape in plan view in consideration of removability. That is, the sectional shape of the support removal trace 22 is preferably a bowl shape.

In consideration of the strength of the supports 23, the diameter D2 of the support removal trace 22 in plan view is preferably 0.3 mm or more and 1.0 mm or less.

As described above, according to the present embodiment, since the support removal traces 22 each have a recessed shape after the supports 23 are removed, the operation of smoothing the support removal traces having protruding shapes can be omitted, and thus the work for the worker can be reduced. Therefore, the work efficiency is improved, and thus the manufacturing cost of the sculpted object 21 can be reduced.

EXAMPLES

Examples 1 and 2 will be described. A sculpting experiment of manufacturing the sculpted object 21 having a width of 50 mm, a length of 30 mm, and a height of 10 mm was conducted in an environment of about 25° C. by using the photo-sculpting apparatus 100 illustrated in FIG. 1. As illumination light, ultraviolet light having a wavelength of 405 nm and a maximum illuminance of 10 mW/cm$^2$ was used. The size of the container 2 was about 70 mm×50 mm×30 mm. The photocurable resin composition 1 was cured by radiating light thereonto from a digital mirror device: DMD element having a resolution of 1920 pixel× 1080 pixel. The size of the sculpting stage 3 was 60 mm×50 mm. A material obtained by adding inorganic filler to a mixture of epoxy and acrylic materials was used as the photocurable resin composition 1.

The sculpting conditions will be described. The radiation energy density E2 for the sculpted object 21 and the supports 23 was set to 80 mJ/cm$^2$. The radiation energy density E1 for the shared layer 24 of the sculpted object 21 and the supports 23 was set to 30 mJ/cm$^2$ and 50 mJ/cm$^2$ for Examples 1 and 2, respectively. After the sculpting process was completed, the worker removed the supports 23 by hand.

The sculpted object 21 from which the supports 23 were removed was washed with ethanol, and an excessive resin liquid attaching to the sculpted object 21 was removed. Then, the sculpted object 21 was dried for 20 minutes in a draft chamber, and the size of the support removal traces 22 was evaluated by using a laser microscope.

In Comparative Example, no shared layer of a sculpted object and supports was provided, and the radiation energy density E2 for the sculpted object and the supports was set to 80 mJ/cm$^2$. Also in Comparative Example, the evaluation of the support removal traces was performed similarly to Examples 1 and 2.

Figure 8:
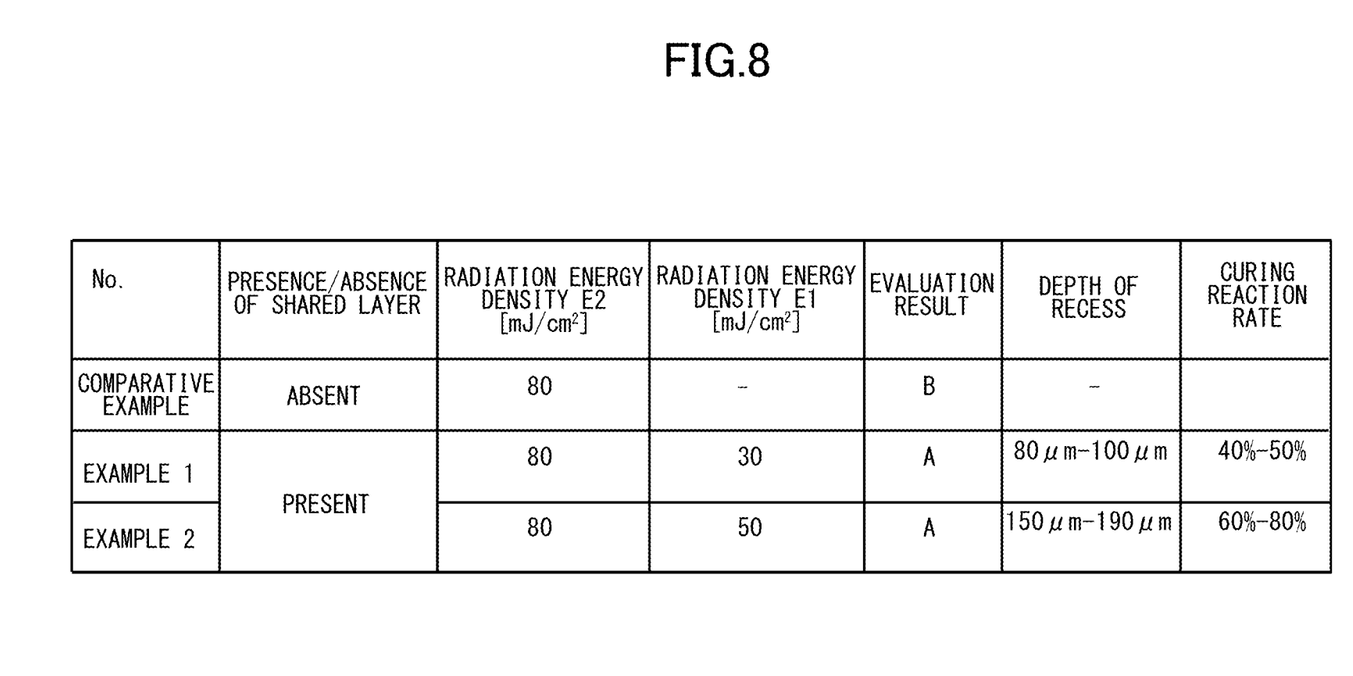
FIG. 8 is a diagram illustrating experimental results of examples and a comparative example.

FIG. 8 illustrates the results of these evaluation. In the evaluation results, A indicates a case where the support removal traces are recessed with respect to the surface of the sculpted object, and B indicates a case where the support removal traces protrude with respect to the surface of the sculpted object.

According to FIG. 8, in Comparative Example, the support removal traces had protruding shapes with respect to the sculpted surface of the sculpted object, and the size of the protruding shapes was in the range of 150 µm to 250 µm.

In Examples 1 and 2, in the case where the shared layer 24 was formed with the radiation energy density E1 of 30 mJ/cm$^2$ or more and 50 mJ/cm$^2$ or less, the sculpted object 21 was manufactured without a sculpting failure, and the support removal traces 22 had recessed shapes with respect to the sculpted surface 210 of the sculpted object 21. At this time, the ratio of the radiation energy density E1 to the radiation energy density E2, that is, E1/E2 was 0.375 or more and 0.625 or less. It was confirmed that the maximum size of the support removal traces 22 was 190 µm.

The curing degree (curing reaction rate) of the portion of the sculpted object 21 where the sculpted surface 210 was formed and the curing degree (curing reaction rate) of the portion of the sculpted object 21 where the support removal traces 22 were formed were measured by Fourier transform infrared spectroscopy: FT-IR. As a result, the ratio of the curing degree of the portion of the sculpted object 21 where the support removal traces 22 were formed to the curing degree (curing reaction rate) of the portion of the sculpted object 21 where the sculpted surface 210 was formed was 0.4 or more and 0.8 or less. In terms of percentage, the ratio was 40% or more and 80% or less. That is, according to Examples 1 and 2, by employing the above-described ratio, the support removal traces 22 having recessed shapes can be formed to a depth that does not degrade the external shape (aesthetic appearance) of the sculpted object 21, that is, to a depth of 0.5 mm or less, preferably 0.2 mm or less. Particularly, also in consideration of the function of the supports 23, it is preferable that the support removal traces 22 are formed to have a depth of 80 µm or more 190 µm or less.

As described above, according to the present disclosure, the work for the worker can be reduced.

The present disclosure is not limited to the embodiments described above, and embodiments can be modified in many ways within the technical concept of the present disclosure. In addition, the effects described in the embodiments are merely enumeration of the most preferable effects that can be obtained from embodiments of the present disclosure, and effects of embodiments of the present disclosure are not limited to those described in the embodiments.

Although a case where the host apparatus 610 and the control apparatus 620 are each constituted by a different computer has been described in the above embodiment, the configuration is not limited to this, and for example, the host apparatus 610 and the control apparatus 620 may be constituted by a single computer. In this case, the single computer can perform generation and execution of the processing program 630.

Furthermore, the contents of disclosure in the present specification include not only contents described in the present specification but also all of the items which are understandable from the present specification and the drawings accompanying the present specification. Moreover, the contents of disclosure in the present specification include a complementary set of concepts described in the present specification. Thus, if, in the present specification, there is a description indicating that, for example, "A is B", even when a description indicating that "A is not B" is omitted, the present specification can be said to disclose a description indicating that "A is not B". This is because, in a case where there is a description indicating that "A is B", taking into consideration a case where "A is not B" is a premise.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-063703, filed on Apr. 7, 2022, which is hereby incorporated by reference herein in its entirety.

What is claimed is:

1. A sculpted object formed from a cured product of a photocurable resin composition, the sculpted object comprising:
   a sculpted surface; and
   a support removal trace recessed with respect to the sculpted surface,
   wherein the support removal trace has a higher surface roughness than a surface roughness of the sculpted surface, and
   wherein the support removal trace has an arithmetic mean roughness Ra of 10 μm to 15 μm.

2. The sculpted object according to claim 1, wherein the support removal trace has a depth of 0.5 mm or less with respect to the sculpted surface.

3. The sculpted object according to claim 1, wherein the support removal trace has a depth of 0.2 mm or less with respect to the sculpted surface.

4. The sculpted object according to claim 1, wherein the support removal trace has a bowl shape.

5. The sculpted object according to claim 4, wherein the support removal trace has a diameter of 0.3 mm to 1.0 mm.

6. The sculpted object according to claim 1, wherein a ratio of a curing degree of part of the sculpted object where the support removal trace is formed to a curing degree of part of the sculpted object where the sculpted surface is formed is 0.4 to 0.8.

7. A manufacturing method for the sculpted object according to claim 1, by curing the a photocurable resin composition, the manufacturing method comprising:
   radiating light onto the photocurable resin composition to form a first cured layer serving as part of a support;
   radiating light onto the photocurable resin composition to form a second cured layer including a first portion and a second portion, the first portion overlapping the first cured layer as viewed in a thickness direction of the first cured layer, the second portion being positioned around the first portion and serving as part of the sculpted object,
   wherein a curing degree of the first portion is lower than a curing degree of the second portion; and
   removing the support from the sculpted object,
   wherein the support removal trace is formed on the sculpted object by removing the support.

8. The manufacturing method according to claim 7, wherein, in the forming the second cured layer, a first radiation energy density of light irradiating the first portion is lower than a second radiation energy density of light irradiating the second portion.

9. The manufacturing method according to claim 8, wherein a ratio of the first radiation energy density to the second radiation energy density is 0.3 to 0.7.

10. A sculpted object formed from a cured product of a photocurable resin composition, the sculpted object comprising:
    a sculpted surface; and
    a support removal trace recessed with respect to the sculpted surface,
    wherein the support removal trace has a higher surface roughness than a surface roughness of the sculpted surface, and
    wherein a ratio of a curing degree of part of the sculpted object where the support removal trace is formed to a curing degree of part of the sculpted object where the sculpted surface is formed is 0.4 to 0.8.

11. The sculpted object according to claim 10, wherein the support removal trace has an arithmetic mean roughness Ra of 10 μm or more.

12. The sculpted object according to claim 10, wherein the support removal trace has a depth of 0.5 mm or less with respect to the sculpted surface.

13. The sculpted object according to claim 10, wherein the support removal trace has a depth of 0.2 mm or less with respect to the sculpted surface.

14. The sculpted object according to claim 10, wherein the support removal trace has a bowl shape.

15. The sculpted object according to claim 14, wherein the support removal trace has a diameter of 0.3 mm to 1.0 mm.

16. A manufacturing method for the sculpted object according to claim 10, by curing the photocurable resin composition, the manufacturing method comprising:
    radiating light onto the photocurable resin composition to form a first cured layer serving as part of a support;
    radiating light onto the photocurable resin composition to form a second cured layer including a first portion and a second portion, the first portion overlapping the first cured layer as viewed in a thickness direction of the first cured layer, the second portion being positioned around the first portion and serving as part of the sculpted object,
    wherein a curing degree of the first portion is lower than a curing degree of the second portion; and
    removing the support from the sculpted object,
    wherein the support removal trace is formed on the sculpted object by removing the support.

17. The manufacturing method according to claim 16, wherein, in the forming the second cured layer, a first radiation energy density of light irradiating the first portion is lower than a second radiation energy density of light irradiating the second portion.

18. The manufacturing method according to claim 17, wherein a ratio of the first radiation energy density to the second radiation energy density is 0.3 to 0.7.

* * * * *